July 27, 1954  V. F. ZAHODIAKIN  2,684,515
FASTENING DEVICE
Filed April 24, 1951  2 Sheets-Sheet 1
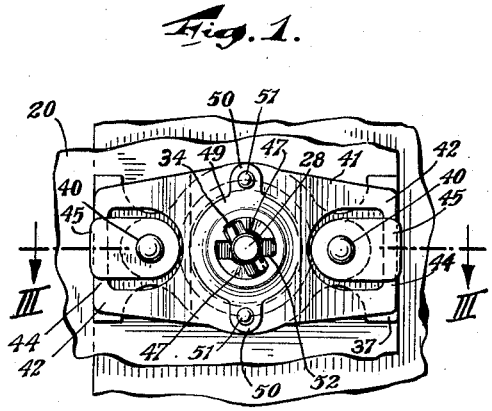
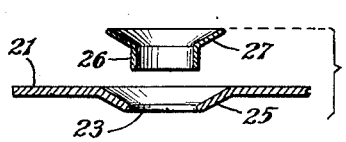
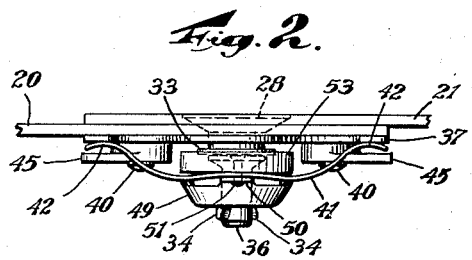
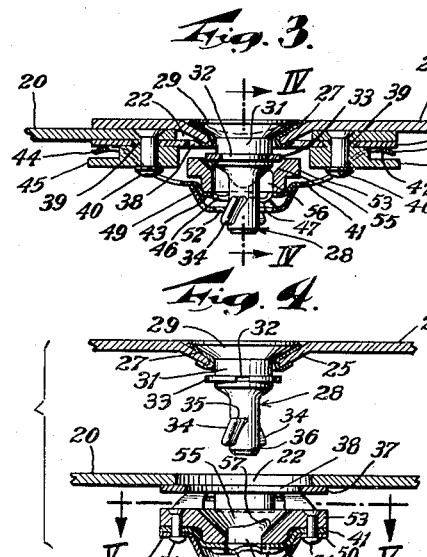
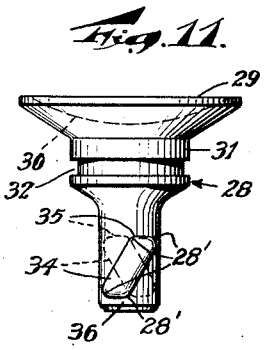
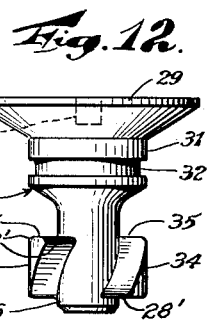
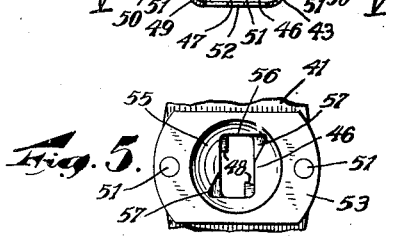
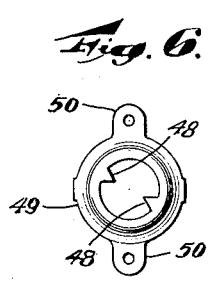
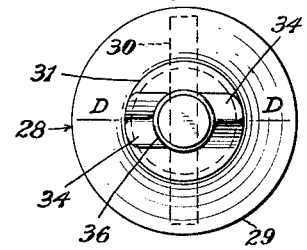
INVENTOR
VICTOR F. ZAHODIAKIN
BY
Howard P. King
ATTORNEY July 27, 1954  V. F. ZAHODIAKIN  2,684,515
FASTENING DEVICE Filed April 24, 1951  2 Sheets-Sheet 2

INVENTOR
VICTOR F. ZAHODIAKIN.
BY
Howard P. King
ATTORNEY

Patented July 27, 1954

2,684,515

UNITED STATES PATENT OFFICE 2,684,515

FASTENING DEVICE

Victor F. Zahodiakin, Summit, N. J.

Application April 24, 1951, Serial No. 222,622

5 Claims. (Cl. 24—221)

This invention relates to fastening devices, and particularly to the stud and socket type of the general character shown in my prior Patent No. 2,257,783 of October 31, 1950, wherein by partial turn of the stud, an interlocking with the socket is obtained.

The present invention utilizes a floating socket structure as in said patent for self-alignment upon insertion of the stud, but with improvement thereover of both the socket and the stud in several important respects.

One object of the present invention is to provide an improved socket member which will more freely receive the stud.

Closely related thereto is another object of guiding the blades of the stud to correct registration with and into the blade-receiving opening of the socket.

A further object of the invention is to improve the blade structure to more freely and certainly find and enter the blade-receiving opening of the socket.

Another object of the invention is to avoid damage to or wear on the protective coating of the member engaged by the stud head.

Of closely related nature is an object to provide an intervening grommet between said member and stud head, and to prevent rotation of said grommet in said member.

Yet another object is to provide for adequate means for economical and accurate formation of the stud.

Still further objects will appear to persons skilled in the art to which the invention appertains as the description proceeds, both by direct recitation thereof and by implication from the context.

Referring to the accompanying drawings, in which like numerals of reference indicate similar parts throughout the several views:

Fig. 1 is a bottom plan of the assembled fastening device of the present invention;

Fig. 2 is an edge view of the same;

Fig. 3 is a sectional view on line III—III of Fig. 1, showing the device in locked condition;

Fig. 4 is a sectional view substantially on line IV—IV of Fig. 3, but showing the device in unlocked condition and the stud withdrawn from the socket;

Fig. 5 is a fragmentary bottom plan of the socket member shown in Fig. 4;

Fig. 6 is a face view of the socket cup;

Fig. 7 is a face view of a portion of the member in which the stud is to be mounted, and showing the hole for ultimate reception of grommet and stud;

Fig. 8 is a face view similar to Fig. 7 and showing the dimple as formed in juxtaposition to the said hole in the member;

Fig. 9 is a section of the member on line IX—IX of Fig. 8 and showing a grommet above the hole ready for entry thereinto;

Fig. 10 is a similar sectional view with the grommet in its assembled position;

Figs. 11 and 12 are elevational views of the stud shown one at a 90° angle of rotation from the other;

Fig. 13 is a bottom plan of said stud; and

Figure 14:
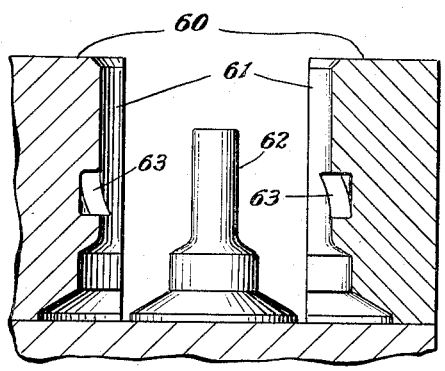
Figure 15:
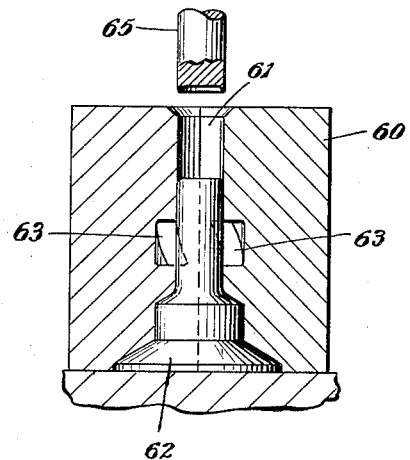
Figure 16:
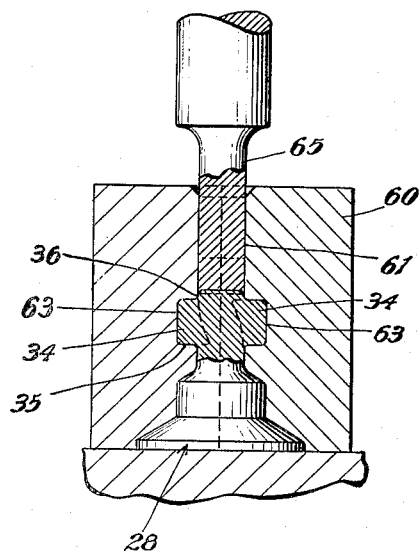
Figure 17:
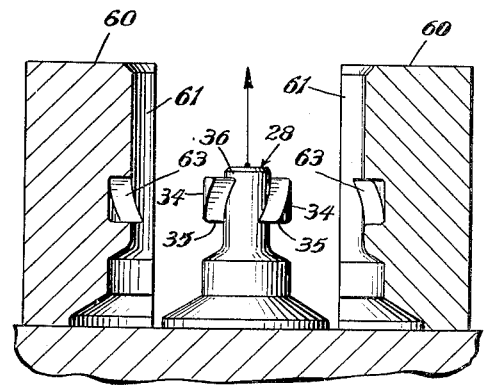

Figs. 14 to 17, inclusive, are sectional views of a split die and showing the several steps in manufacture of said stud.

In the specific embodiment of the invention illustrated in said drawings, the reference numerals 20, 21 designate juxtaposed members adapted to be clamped together in an overlapped position. For convenience in making distinguishing reference thereto, the members will be arbitrarily referred to as inner member 20 and outer member 21. Particular attention has been given to aircraft construction and requirements in the development of the present invention and it may therefore not be amiss to point out that various parts of airplanes, such as wing and fuselage plates, cowls, hoods and other parts or members are overlapped and secured together. It has become quite common practice to now use some form of stud-and-socket securing means in place of rivets and bolts. For lightness in construction, magnesium or magnesium alloy is extensively used as the plates and other members mentioned above in fabricating aircraft, but as that material is subject to corrosion, it is usually protected by a suitable coating, such as by a lacquer. As will become more apparent hereinafter, a feature of the present invention is to permit use of studs to secure the members together without subjecting the protective coating to wear or injury by said studs.

The members to be secured are pre-punched with holes 22, 23 respectively which are intended to register when the members are assembled, the hole 23 of the outer member, however, being smaller than the hole 22 in the inner member. The said smaller or outer member hole 23 has an irregularity of contour, and in the present showing said hole is shown with several chordal lips 24 inwardly from true circular shape of hole, and as three such lips have been selected for the present disclosure, the hole has a somewhat triangular appearance. Preferably, although not necessarily, after the hole is punched, it is peened by a suitable die to form a dimple 25 in the metal with the hole substantially centrally disposed on the dimple. The peening of the metal to form the dimple has the effect of enlarging the hole somewhat from its original size, but the general shape with chordal lips 24 is still retained. The protective coating on the member is applied after the holes 23 have been punched and dimples 25 formed.

Next, a grommet 26, the shank of which has appropriate initial diameter to enter the hole between the chordal lips is applied from the concave side of the dimple so that the flare 27 of the grommet is located against the inside or concave face of the dimple. A suitable tool is then applied to rivet the projecting rim of the grommet on the convex face of the dimple, the tool and applied pressure pressing the chordal edges of the lips radially outward to some extent and compressing the metal of the grommet into the irregularities of the hole. The inside or hole portion of the grommet is substantially circular, but the compression of the grommet having forced its outer surface into contact with the irregularities of the hole locks the grommet with exceeding tenacity non-rotatably in the hole and on the dimple. In use of the device, the head of stud 28 hereinafter described has its bearing against the grommet flare and rotation of the stud consequently introduces contacting movement between the stud and grommet and no movement whatever between the grommet and member, thus assuring that coating on said member will suffer no abrasion or injury by repeated rotation of said stud.

Stud 28 above referred to provides a head 29 having a tapered under shoulder for engagement with the flare of said grommet, and having a kerf 30 in its outer face for convenient rotational manipulation of the stud. Under said head, the stud is provided with a cylindrical neck 31 of appropriate size to rotatably pass through the hole of grommet 26, and at a level slightly below the grommet is provided with a peripheral groove 32 to receive a split ring 33 for retaining the stud assembled with and projecting from said outer member 21. This assembly of stud 28 in the grommet and member may be accomplished in the field or place where the members are being assembled. The projecting part of the stud remote from head 29 is provided with sloped flat blades 34 providing undercut or transverse shoulders 35 at a common planar distance from the head and inwardly toward the head from said remote end of the stud. The several corners of the said blades are rounded, as at 28', so as to be tangential to adjoining faces of the blade and conducive to greater ease in sliding with respect to engage surfaces. The shank portion of the stud projects beyond the far ends of the blades, thereby providing a cylindrical tip 36 for the stud. This tip conveniently functions to guide the stud when introducing the stud in the socket of the fastening device. The sloped flat blades 34 project laterally from the stem portion of the stud each with an advancing face which slopes in a direction longitudinally of the stud but at every plane perpendicular to the axis of the stud the intersecting line therewith of the advancing faces of the blades are straight lines and extensions of a common diameter as, for instance, line D—D of Fig. 13.

The socket-providing mechanism to cooperate with the stud is constructed as a unitary assembly to be later secured in place, in the field or elsewhere, upon inner member 20 in surrounding and overlying proximity to hole 22. Said assembly comprises an attaching plate 37, here shown as flat, of suitable sheet metal such as aluminum, stainless steel or the like, of elongated shape and with a stud hole 38 at its middle large enough to pass the stud therethrough even though said hole is not precisely aligned with the hole of either member when assembled in the field. Rivet holes 39 are provided in this base plate 37 to ultimately receive, when applying the assembly for use on member 20, rivets 40.

Further structural parts of the said unitary assembly include a resilient floating bridge, as described in said patent, and here identified by numeral 41, said bridge having feet 42, one at each corner thereof, which rest and are slidable flatwise upon base-plate 37. The bridge bulges toward a mid-part of the same so as to space said mid-part away from said base-plate, and at said mid-part said bridge provides a hollow annular embossment 43 projecting still further from the base-plate. The two feet constituting a pair at each end of the bridge are tied together by a tie-bar 44 transverse to the bridge and shown as an integral part therewith. The bridge is held, with limited slidable movement permitted, to the base plate by retainers 45 fixed on the base plate and projecting over said tie bars 44, thereby obtaining a floating assembly of bridge upon the base-plate.

The embossment 43, above mentioned, provides an oblong hole 46 having a width no less than the diameter of the stud shank and a length no less than the distance between outer ends of the pair of vanes or blades on said stud. Rotation of the stud in said slot draws the resilient bridge inward at its middle until the shoulders of the blade come out of the slot and then ride upon the margin or ledge of the outer face of the embossment next the longitudinal edge of the opening. Further along on each said ledge, and in the present showing in an anticlockwise direction of rotation of the stud as viewed in Fig. 1, there is provided a forwardly outwardly sloping cam 47 the pair of which are located to be simultaneously engaged by the two blade shoulders. Further rotation of the stud then causes the shoulders to ride over the cams thereby requiring the bridge to resiliently depress as the blades ride up over the cam to seating position in slight depressions at the rear of the cams sufficient to prevent return rotation of the said blades until positively turned by use of a tool. It is in this seated position of the blades in said depressions at the rear of the cams that the desired clamping pressure for retention of members 20, 21 is obtained.

Stops 48 to limit rotation of the blades to not override the clamping position on the cams are provided as integral parts with a cap 49 attached to the top of the bridge, as by lateral ears 50 and rivets 51. Said cap is dome-shaped to overlie the embossment of the bridge, having a somewhat greater bulge than said embossment so as to be spaced outwardly therefrom in an axial direction. The central portion of the dome is circularly open with diametric dimension of the opening 52 substantially equal to the distance between the outer ends of the stud blades, so that said blades will enter said opening and will function to locate the bridge substantially symmetrically with respect to said stud and blades. Aforementioned stops 48 are constituted as triangular projections inwardly of opening 52 and integral with the wall of the dome of said cap 49.

By virtue of embossment 43 of the bridge being formed with sheet steel, the underside thereof constitutes a hollow or pocket, and in said pocket I secure an eyelet 53 having a peripheral flange underlying said bridge adjacent the embossment, said flange having greater width laterally of the bridge than longitudinally thereof and secured at the lateral part by the small rivets 51 at the sides of the bridge opposite the embossment. The riser portion of the eyelet has adequate fitting engagement with the pocket wall so as to be immovable laterally in the pocket in consequence of which the small rivets 51 will not be subjected to shearing stresses. The inside of the eyelet constitutes a stud-passing and aligning hole of which a portion 55 toward the base plate is frustoconical contracting toward the bridge, and an outer portion 56 of which is oblong with the longer dimension longitudinally of the bridge. The larger part of the frusto-conical aligning hole portion 55 has adequate diameter to insure guiding contact to be obtained therewith in all positions of the bridge by the stud so as to guide the stud toward the oblong portion 56 under all conditions of attempted assembly.

A pair of corners of the oblong hole portion 56 and adjacent conical portion 55 at diagonally opposed corners of said oblong portion, are preferably tapered outwardly toward the larger end of the conical portion as as to provide guiding sluices 57 in direction of forward assembly of the stud into the bridge. These sluices preferably have an angle of slope substantially equal to the pitch slope of the stud blades and function to guide the blades into the ends of the oblong opening. Tool-operated rotation of the stud will cause the front faces of the blades to ride forwardly on the guiding sluices until the blade shoulders ride up over the bridge as previously described. It may now be appropriately noted that observing the oblong opening 56 in plan, the said sluices 57 are located at two diagonal corners and the blade rotation stops 48 have a location above the other two diagonal corners of said oblong opening. The blades, when depressing the bridge extend in a direction cross-wise of said oblong opening and therefore have maximum bearing on the bridge in position of load resistance of use.

A feature of the present invention, in addition to the structure of stud herein shown and above described, is comprised in the method of fabrication of the said stud. As shown in the several figures of Sheet 2 of the drawings, an appropriately split or sectional die 60 is provided having a work cavity 61 therein for a headed stud blank 62 of greater length than desired for the finished stud. The work cavity includes a pair of lateral pockets 63 having location and shape desired for the blades on the stud. The stud blank is placed in the die (hot or cold), the die is closed, and thereafter a compression die 65 is forced longitudinally against the small end of the stud thereby forcing the metal of the stud into the lateral pockets of the die and thus forging the stud with a central core and laterally extending longitudinally sloping blades as an integral assembly. The forging die is withdrawn, the split die opened and the stud removed. By using the forging method above described, maximum strength of stud and blades is obtained.

It should also be further noted that in the present showing the several corners or edges of the blades are rounded both for the increased surface tension gained thereby but also to avoid interference by any corners catching or detrimentally functioning as scrapers or knife edges.

It is therefore especially pointed out that the radii and radial centers of these rounded corners are precise with respect to adjoining faces of the blades so that said faces are exact tangents to the curves of those rounded corners. Furthermore, the fact that the blades have their front or working faces diametric at all planes perpendicular to the axis, gives an extended contact with the sluice or other cooperating stud-advancing surface, giving maximum angle and contact for advancing purposes. The axial compression is therefore spread over greater surface and is minimized for any given point of contact.

I claim:

1. A fastening device for members to be clamped thereby, comprising a stud having a shank with a heat at one end and blades projecting laterally from said shank with the lines of intersection of a plane through the forward faces of said blades being common with a diameter of said shank, and a socket assembly for said stud, said socket assembly having an oblong opening therethrough the length whereof is substantially the distance between outer ends of the blades and the width whereof is substantially the diameter of said shank, and said socket assembly having means at the entire periphery of the opening for guiding the shank and blades into said opening.

2. A fastening device for members to be clamped thereby, comprising a stud having a shank with a head at one end and blades projecting laterally from said shank with shoulders at the ends of the blades toward said head, said shoulders projecting radially from the shank the full width of projection of the blades from the shank, a resilient bridge having an oblong opening therethrough the long dimension whereof is substantially the distance between outer ends of said shoulders and the shorter dimension whereof is substantially the diameter of said shank whereby said blades may be passed through said opening the long way thereof and said shoulders will have contact for their full lengths when rotated to overlie the margin of the bridge next the long dimensions of said opening, and said socket assembly having means at the entire periphery of the opening for guiding the shank and blades into said opening.

3. A fastening device for members to be clamped thereby, comprising a stud having a shank with a head at one end and blades projecting laterally from said shank, and a socket assembly for said stud, said socket assembly having an oblong opening therethrough the length whereof is substantially the distance between outer ends of the blades and the width whereof is substantially the diameter of said shank, said opening having sloping sluices at diametrically opposite corners thereof for guiding and rotating said blades in said opening.

4. A fastening device for members to be clamped thereby, comprising a stud having a shank with a head at one end and blades projecting laterally from said shank, and a socket assembly for said stud, said socket assembly having an oblong opening therethrough the length whereof is substantially the distance between outer ends of the blades and the width whereof is substantially the diameter of said shank, said opening having diagonally opposite sloping sluices at diametrically opposite corners thereof for guiding and rotating said blades in said opening, and a cap opposite said opening and having stops adapted to be engaged by and limit rotation of said blades to approximately a quarter turn from entry position of the blades into said opening.

5. A fastening device for members to be clamped thereby, comprising a stud having a shank with a head at one end and blades projecting laterally from said shank, and a socket assembly for said stud, said socket assembly having an oblong opening therethrough the length whereof is substantially the distance between outer ends of the blades and the width whereof is substantially the diameter of said shank, said opening having diagonally opposite sloping sluices at diametrically opposite corners thereof for guiding and rotating said blades in said opening, and a cap opposite said opening and having stops overlying the other diagonals of said opening adapted to be engaged by and limit rotation of said blades to approximately a quarter turn from entry position of the blades into said opening.

References Cited in the file of this patent

UNITED STATES PATENTS

| Number | Name | Date |
|---|---|---|
| 649,761 | Saltzkorn et al. | May 15, 1900 |
| 1,723,769 | Davis | Aug. 6, 1929 |
| 2,038,543 | Clouse | Apr. 28, 1936 |
| 2,044,986 | Horton | June 23, 1936 |
| 2,111,046 | Friedman | Mar. 15, 1938 |
| 2,152,231 | Yaneson | Mar. 28, 1939 |
| 2,275,226 | Hudson | Mar. 3, 1942 |
| 2,307,132 | Hufferd | Jan. 5, 1943 |
| 2,309,733 | Jones | Feb. 2, 1943 |
| 2,325,295 | Zaleske | July 27, 1943 |
| 2,341,469 | Newall | Feb. 8, 1944 |
| 2,399,181 | Graham | Apr. 30, 1946 |
| 2,440,790 | Venditty | May 4, 1948 |
| 2,527,783 | Zahodiakin | Oct. 31, 1950 |